United States Patent
Dashevskiy et al.

(10) Patent No.: US 11,526,778 B2
(45) Date of Patent: Dec. 13, 2022

(54) FUTURE USER DEVICE PREFERENCE PREDICTION BASED ON TELECOM DATA

(71) Applicant: T-Mobile USA, Inc., Bellevue, WA (US)

(72) Inventors: Tatiana Dashevskiy, Edmonds, WA (US); Rami Al-kabra, Bothell, WA (US); Zunyan Xiong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1011 days.

(21) Appl. No.: 16/225,761

(22) Filed: Dec. 19, 2018

(65) Prior Publication Data

US 2020/0202234 A1 Jun. 25, 2020

(51) Int. Cl.
*G06N 5/04* (2006.01)
*H04W 8/18* (2009.01)
*G06N 20/00* (2019.01)

(52) U.S. Cl.
CPC ............ *G06N 5/04* (2013.01); *G06N 20/00* (2019.01); *H04W 8/18* (2013.01)

(58) Field of Classification Search
CPC ............ G06N 5/04; G06N 20/00; H04W 8/18
See application file for complete search history.

(56) References Cited

U.S. PATENT DOCUMENTS

| | | | | |
|---|---|---|---|---|
| 2004/0235484 | A1* | 11/2004 | Korpela | H04W 24/02 455/446 |
| 2015/0016440 | A1* | 1/2015 | Erdmann | H04W 24/02 315/291 |
| 2017/0169345 | A1* | 6/2017 | de Knijf | G06N 20/00 |
| 2017/0220933 | A1* | 8/2017 | Gonguet | G06Q 10/101 |
| 2018/0018684 | A1* | 1/2018 | Orr | G06Q 30/0202 |
| 2019/0042982 | A1* | 2/2019 | Qu | G06K 9/623 |
| 2019/0188584 | A1* | 6/2019 | Rao | G06Q 10/00 |
| 2019/0340820 | A1* | 11/2019 | Sivanadian | G02B 27/0172 |
| 2020/0026590 | A1* | 1/2020 | Lopez | G05B 23/0243 |

* cited by examiner

*Primary Examiner* — Dave Misir
(74) *Attorney, Agent, or Firm* — Han Santos, PLLC

(57) ABSTRACT

Aspects of the present disclosure provide for future user device preference prediction based on telecom data. In one aspect, a computer-implemented method includes collecting the telecom data from at least one node of a wireless communication network, where the telecom data includes records for a plurality of occurrences of user interaction with the wireless communication network via a respective current user device. The telecom data is then applied to a predictive model to obtain a prediction of future user device preferences. The prediction of the future user device preferences may include an indication that a user will switch from the respective current user device to another user device for future use with the wireless communication network. The method further includes performing an action with respect to the wireless communication network in response to the prediction of future user device preferences.

16 Claims, 5 Drawing Sheets

FUTURE USER DEVICE PREFERENCE PREDICTION BASED ON TELECOM DATA

BACKGROUND

Wireless communication devices are integral to the daily lives of most users. Wireless communication devices are used to make voice calls, check email and text messages, update social media pages, stream media, browse websites, and so forth. Accordingly, manufacturers of wireless communication devices are constantly developing new models in an attempt to provide users with new and improved capabilities. Thus, the users of wireless communication devices expect telecommunication carriers to have the latest models available for sale/use, and also for the carriers to provide constant and reliable telecommunication and data communication services that take advantage of these new capabilities.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
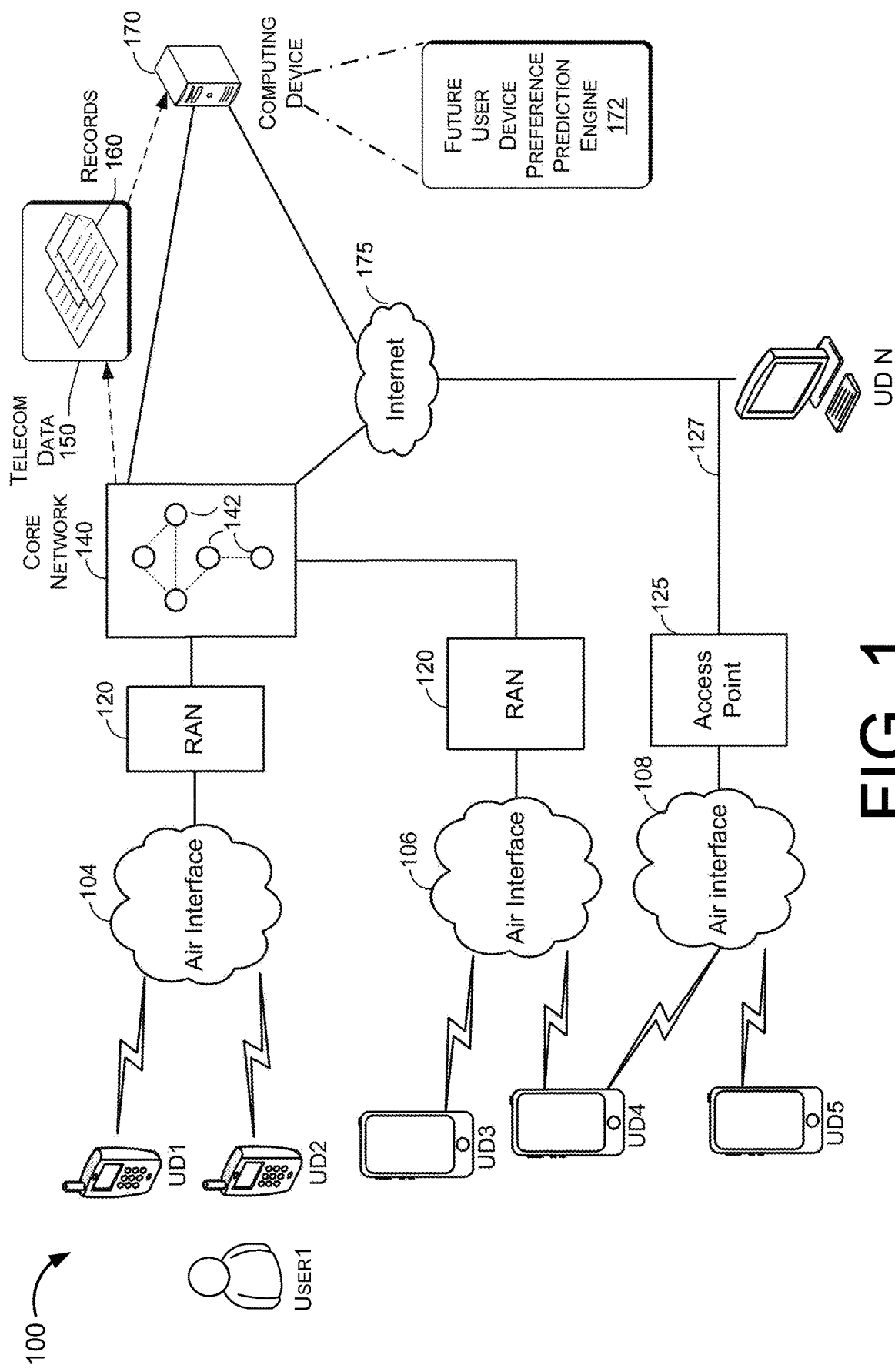
FIG. 1 illustrates a high-level system architecture of a wireless communication network that provides for future user device preference prediction.

Aspects of the present disclosure are directed to predicting if/when a user (e.g., customer of a mobile network operator (MNO)) will switch (e.g., upgrade) a user device that the user utilizes to access a wireless communication network operated by the MNO. In addition to predicting if/when the customer will switch user devices, aspects may also include predicting the type, brand, and/or model of the user device that the user will switch to.

The determination of how many and when customers will switch user devices may be applied to forecasting device supply, for correctly fulfilling telecom needs related to customer preferences, and/or for optimizing cost and supply distribution in stores.

In some aspects a predictive model may be generated based on telecom data such as Event Data Records (EDRs). For example, click stream data such as domain and protocol data may be collected over a time period (e.g., 3 months). The domain data may include the domain name of websites/internet services that are visited by users, whereas the protocol data may include additional information such as: protocols utilized (e.g., http, https, etc.), a number of hits at a particular domain over a certain time period, an amount of data exchanged, a duration of a visit to the domain, a frequency with which that domain was visited, etc.

Features may then be identified from the collected click stream data, where a feature is an identifiable set of one or more data points that are comparable. The identified features are then filtered such that they represent a threshold number of users of the wireless communication network. For example, an identified feature that only represents a minor number (e.g., <50%) of users would be discarded, whereas a feature that corresponds to a majority (e.g., >50%) of users would be kept.

The identified and filtered features may then be separated into two groups: a control group (users that did not switch devices over the time period that the data was collected) and a switcher group (users who indeed switched devices during the time period that the data was collected).

The features may be further filtered to keep only those features that clearly indicate that a user has/will switch devices. For example, a feature that has a close correlation to both the control group and the switcher group may be discarded (e.g., an identified feature has a 50% chance of indicating that a user will switch devices and a 50% chance of indicating that a user will not switch devices). Conversely, if a feature is closely correlated to one of the groups, then the feature may be retained and applied to the predictive model (e.g., in 90% of the occurrences that this feature appears, the user ends up switching devices, or in 90% of the occurrences that this feature appears, the user ends up not switching devices).

The generated predictive model may then be applied to further incoming telecom data (e.g., click-stream data) to identify and/or quantify users that will be likely switching devices in the future. As mentioned above, this prediction may be used to adjust supply chains and/or optimize the wireless communication network for future use.

In some examples, the prediction of future user device preferences may be supplemented with additional data such as a user location to identify future supply issues and/or network issues that are specific to a certain geographic region.

In addition, the collection of telecom data may be done on a sliding window basis where the predictive model may be continuously updated (e.g., every month, collect previous 3 months of telecom data to update the predictive model). The techniques described herein may be implemented in a number of ways. Example implementations are provided below with reference to the following figures.

Example Network Architecture

FIG. 1 illustrates a high-level system architecture of a wireless communication network 100 in accordance with aspects of the present disclosure. As shown in FIG. 1, a user (e.g., USER1) may access one or more services provided by the wireless communication network 100 via one or more respective current user devices (UDs 1 . . . N). The UDs 1 . . . N can include cellular telephones, personal digital assistant (PDAs), pagers, a laptop computer, a desktop computer, and so on. For example, in FIG. 1, UDs 1 . . . 2 are illustrated as cellular calling phones, UDs 3 . . . 5 are illustrated as cellular touchscreen phones or smart phones, and UD N is illustrated as a desktop computer or PC.

Referring to FIG. 1, UDs 1 . . . N are configured to communicate with an access network (e.g., the radio access network (RAN) 120, an access point 125, etc.) over a physical communications interface or layer, shown in FIG. 1 as air interfaces 104, 106, 108 and/or a direct connection 127. The air interfaces 104 and 106 can comply with a given cellular communications protocol, such as, Code Division Multiple Access (CDMA), Evolution Data-Optimized (EVDO), evolved High Rate Packet Data (eHRPD), Global System for Mobile communications (GSM), Enhanced Data rates for GSM Evolution (EDGE), Wideband CDMA (W-CDMA), Long Term Evolution (LTE), etc., while the air interface 108 can comply with a wireless IP protocol (e.g., IEEE 802.11). The RAN 120 includes a plurality of access points that serve UDs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UDs served by the RAN 120 and other UDs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UD N is shown as connecting to the Internet 175 directly (i.e., separate from the core network 140, such as over a direct connection 127 that may include an Ethernet connection, Wi-Fi, or 802.11-based network). The Internet 175 can thereby function to bridge packet-switched data communications between UD N and UDs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UD 4 or UD 5 over a local wireless connection, such as IEEE 802.11 in an example. UD N is shown as a desktop computer with a wired connection to the Internet 175, such as direct connection 127 to a modem or router, which can correspond to the access point 125 itself in an example (e.g., for a Wi-Fi router with both wired and wireless connectivity).

Referring to FIG. 1, computing device 170 is shown as connected to the Internet 175, the core network 140, or both. The computing device 170 may be implemented as a plurality of structurally separate servers, or alternately may correspond to a single server. As will be described below in more detail, the computing device 170 includes a future user device preference prediction engine 172 that is configured to generate a prediction of future user device preferences based on telecom data 150. In one example, the telecom data 150 includes records 160 (e.g., event data records (EDRs)) for a plurality of occurrences of user interaction with the wireless communication network 100 via a respective current user device (e.g., UD1, UD2, . . . , UDN). In some aspects, the telecom data 150 is collected (e.g., received) from one or more nodes 142 of the core network 140. The one or more nodes 142 of the core network 140 may correspond to one or more servers and/or functions provided by the core network 140, such as a gateway, an IP multimedia subsystem (IMS), a Call Session Control Function (CSCF), a Mobility Management Entity (MME), a Home Subscriber Server (HSS), an event data recorder (EDR), a Telephone Application Server (TAS), and the like.

The future user device preference prediction engine 172 may collect the telecom data 150 and apply the telecom data 150 to a predictive model to obtain a prediction of future user device preferences that includes at least an indication that a user (e.g., USER1) will switch from a respective current user device (e.g., UD1) to another user device (e.g., UD2) for future use with the wireless communication network 100. The future user device preference prediction engine 172 may then perform one or more actions with respect to the wireless communication network 100 based on the obtained prediction. For example, the future user device preference prediction engine 172 may communicate with one or more nodes 142 of the core network 140 to change one or more parameters and/or may generate a report for one or more user device distributors (e.g., stores, manufacturers, etc.) that indicates the future user device preferences.

Example Computing Device Components

Figure 2:
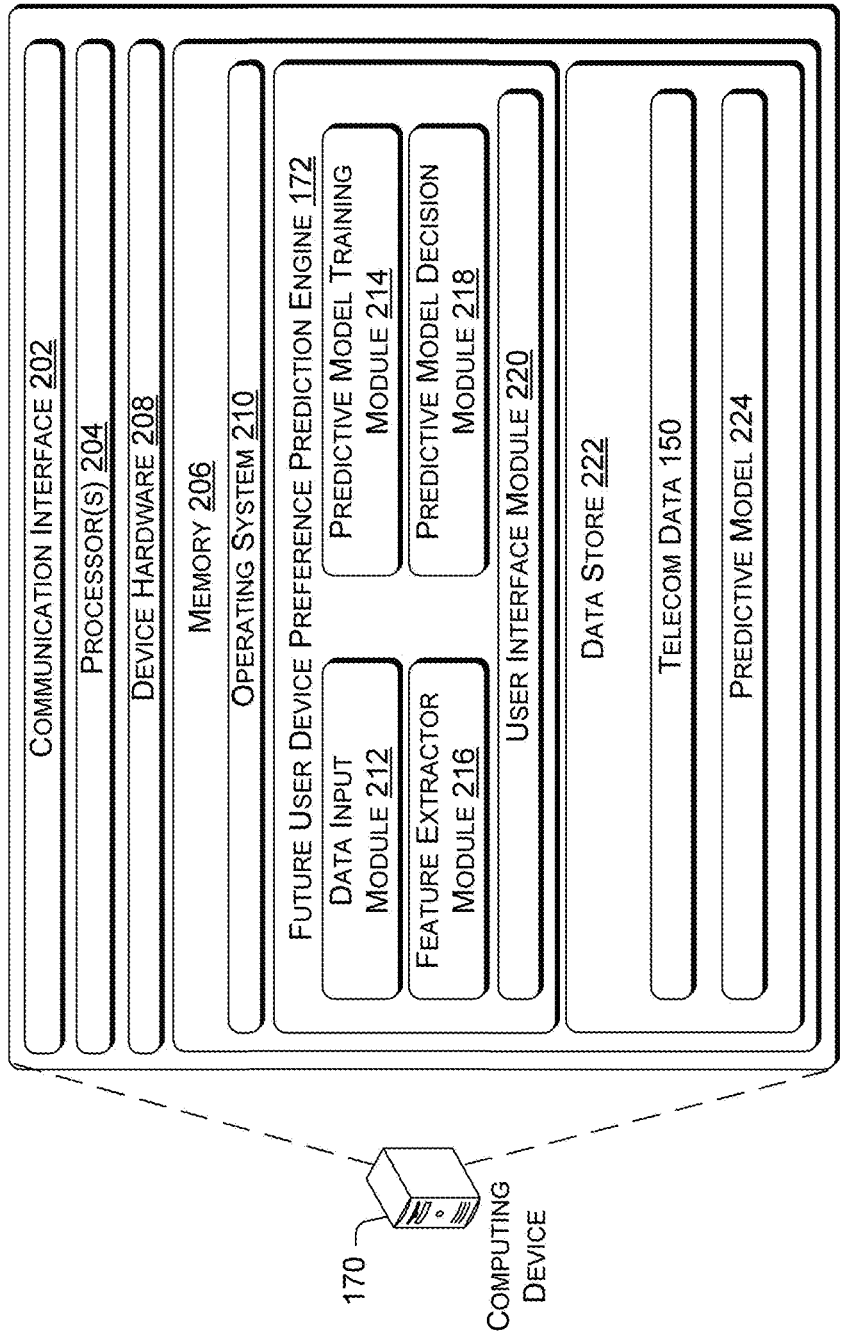
FIG. 2 is a block diagram of a computing device that implements future user device preference prediction.

FIG. 2 is a block diagram of a computing device 170 that implements future user device preference prediction. The future user device preference prediction engine 172 may be implemented on one or more computing devices that are a part of the core network 140. The computing device 170 may include general purpose computers, such as desktop computers, tablet computers, laptop computers, servers, or other electronic devices that are capable of receive inputs, process the inputs, and generate output data. In other embodiments, the computing device 170 may be a virtual computing device in the form of virtual machines or software containers that are hosted in a cloud. The computing device 170 may be equipped with a communication interface 202, one or more processors 204, memory 206, and device hardware 208. The communication interface 202 may include wireless and/or wired communication components that enable the computing device 170 to transmit data to and receive data from other networked devices via a communication network. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 204 and the memory 206 of the computing device 170 may implement an operating system 210 and the future user device preference prediction engine 172. The operating system 210 may include components that enable the computing device 170 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The future user device preference prediction engine 172 may include a data input module 212, a predictive model training module 214, a feature extractor module 216, a predictive model decision module 218, and a user interface module 220. The predictive model training module 214 and predictive model decision module 218 may also interact with a data store 222. These modules may include routines, program instructions, objects, and/or data structures that perform particular tasks or implement particular abstract data types.

The data input module 212 may receive the telecom data 150 from one or more nodes 142 of the wireless communication network 100. The data input module 212 may store the telecom data 150 in the data store 222.

In some aspects, the telecom data 150 includes records 160 for a plurality of occurrences of user interaction with the wireless communication network 100. For example, the records 160 may include several event data records (EDRs), where each EDR corresponds to one occurrence of a user's (e.g., USER1's) interaction with the wireless communication network 100 via a respective current user device (e.g., UD1). In some examples, the EDRs comprise click-stream data corresponding to a navigation of the Internet 175 by the user. In some aspects, the click-stream data may include a time-ordered sequence of hyperlinks, websites, and/or other internet services that a user navigates utilizing their respective current user device via wireless communication network 100. By way of example, an EDR that includes click-stream data may indicate that a user starts their navigation of Internet 175 within a website or at a separate 3rd party website, such as a search engine results page, followed by a sequence of successive webpages visited by the user.

In some examples, the click-stream data included in the records 160 may include both domain data and protocol data. The domain data may indicate at least one domain name of an internet service or website visited by the user via their respective current user device. The protocol data may provide other information related to the user's navigation of the Internet 175, such as a protocol (e.g., HTTP, HTTPS, FTP, etc.) utilized by the current user device when accessing the internet service or website, a frequency with which the current user device accessed the internet service or website, an amount of data exchanged between the current user device and the internet service or website, and/or a duration of at least one occurrence (e.g., session) of the user accessing the internet service or website.

The predictive model decision module 218 may apply the telecom data 150 to a predictive model 224 to obtain an indication that a user will switch from a respective current user device (e.g., UD1) to another user device (e.g., UD2) for future use with the wireless communication network 100. In some examples, the prediction of future user device preferences may further include an indication of when the user will switch from their current user device to another user device. In further examples, the prediction may include an indication of a type, brand, and/or model of the other user device (i.e., the user device that the user is predicted to switch to). Even still, the prediction may include an indication of how many users will switch from their respective current user devices to another user device.

The Predictive model decision module 218 may also perform one or more actions based on the prediction of future user device preferences. For example, as discussed above, the predictive model decision module 218 may communicate with one or more nodes 142 of the core network 140 to change one or more parameters of the one or more nodes 142 based on the prediction. In another example, the action performed by the predictive model decision module 218 may include generating a report for one or more user device distributors (e.g., stores, manufacturers, etc.) that indicates the future user device preferences.

The predictive model training module 214, in conjunction with the feature extractor module 216, may perform operations related to updating the predictive model 224 based on the telecom data 150. As mentioned above, the collection of telecom data 150 may be done on a sliding window basis where the predictive model 224 may be updated at regular intervals (e.g., every month, collect previous 3 months of telecom data to update the predictive model 224). Particular details regarding the updating of the predictive model 224 will be discussed below with reference to process 400 of FIG. 4. However, in general, the process of updating the predictive model 224 may include, first, the extraction of features from the telecom data 150 performed by the feature extractor module 216. In some aspects, a feature is an identifiable set of one or more data points that are comparable. In the context of click-stream data, an extracted feature may correspond to a particular time-ordered series of domain data as well as protocol data. For example, the feature extractor module 216 may identify a first feature that corresponds to a user visiting a particular domain for a certain duration, where a particular amount of data was exchanged between the domain and the user's current user device. In another example, an identified feature may correspond to a user visiting a first domain, followed by a visit to a second domain, where this pattern of visiting the first domain and second domain was repeated by the user multiple times over a certain time period (e.g., every day for 4 days in a row).

Once the features are identified by the feature extractor module 216, the predictive model training module 214 may further process the features to ensure that the extracted features represent a threshold number of users of the wireless communication network 100 and to ensure that the extracted features have a strong correlation to users who have/will switch user devices and/or a strong correlation to users who have/will not switch user devices. The predictive model training module 214 may then update the predictive model 224 based on the extracted and processed features. In some examples, the predictive model 224 is stored in the data store 222.

The user interface module 220 may enable an administrator to interact with the modules of the future user device preference prediction engine 172 via data input devices and data output devices. For example, the user interface module 220 may enable the administrator to select the type, the amount, or the source of telecom data 150 that are analyzed by the future user device preference prediction engine 172. In another example, the administrator may also use the user interface module 220 to select a particular type of machine-learning algorithm to apply by the predictive model training module 214 and/or the predictive model decision module 218. In other examples, the administrator may also use the user interface module 220 to input or modify the specific response or action to be performed by the computing device 170 in response to a determined prediction of future user device preferences.

In some examples, the predictive model training module 214 and/or the predictive model decision module 218 may implement one or more machine learning techniques that are supervised, unsupervised, or include reinforcement learning techniques. Examples of supervised learning techniques include K-nearest neighbor (KNN), Naive Bayes, logistic regression, support vector machine (SVM), and others. Other supervised learning analysis techniques include linear or polynomial regression analysis, decision tress analysis, and random forests analysis. Examples of unsupervised learning analysis techniques include association analysis, clustering analysis, dimensionality reduction analysis, hidden Markov model analysis techniques, and others. Examples of clustering analysis techniques include K-means, principal component analysis (PCA), singular value decomposition (SVD), incremental clustering, and probability-based clustering techniques. The reinforcement learning technique may be, for example, a Q-learning analysis technique. The techniques described above are some examples of machine learning techniques that may be utilized by the computing device 170 to generate clustered features and/or to identify a particular future user device preference. These are not intended to be limiting.

In some aspects, the predictive model decision module 218 may also be configured to determine (e.g., calculate) a confidence level, mapping the telecom data 150 to a particular future user device preference.

The data store 222 may store data that are used by the various modules of the future user device preference prediction engine 172. The data store 222 may include one or more databases, such as relational databases, object databases, object-relational databases, and/or key-value databases. In various embodiments, the data store 222 may store the telecom data 150 that are collected from one or more nodes of the wireless communication network 100. The data store 222 may also store the predictive model 224.

In some embodiments, the future user device preference prediction engine 172 may be implemented using a distributed-computing framework that distributes the analysis of the telecom data 150 to multiple computing nodes. In such embodiments, a centralized cluster manager may control how each computing node executes tasks for different parts of the root cause analysis. For example, one driver program may store the context of the analysis job and distribute processing tasks to multiple worker nodes. Each worker node may have its own cache and tasks to finish, which corresponds to processing a subset of the telecom data 150. The framework can be deployed by organizing the worker nodes in a cloud service with the system scripts running on the worker nodes.

Example Processes

Figure 3:
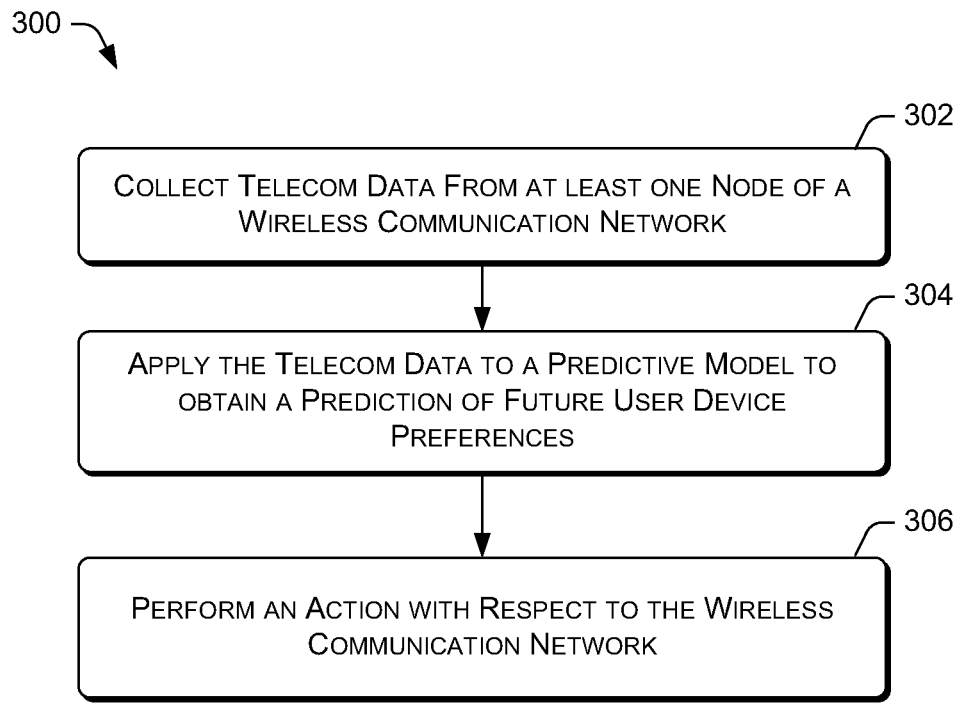
FIG. 3 is a flow diagram of an example process for future user device preference prediction based on telecom data.

FIG. 3 is a flow diagram of an example process 300 for future user device preference prediction based on telecom data. Process 300 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Process 300 is one example process that may be performed by future user device preference prediction engine 172 and thus, is described with reference to FIGS. 1, 2, and 3.

In process block 302, the data input module 212 collects (e.g., receives, queries, etc.) the telecom data 150 from at least one node (e.g., one or more nodes 142) of the wireless communication network 100. In some examples, the data input module 212 may be configured to periodically collect the telecom data 150 (e.g., every month, collect previous 3-months' worth of telecom data 150). Next, in a process block 304, the predictive model decision module 218 applies the telecom data 150 to the predictive model 224 to obtain a prediction of future user device preferences. As mentioned above, the prediction may include an indication that a user will switch from a respective current user device to another user device for future use with the wireless communication network 100. The prediction may include other information such as the number of users who are expected to switch user devices, a model, brand, and/or type of the user device that a user is expected to switch to, as well as when the user(s) are expected to switch user devices. Next, in process block 306, the predictive model decision module 218 performs at least one action with respect to the wireless communication network 100 based on the prediction of future user device preferences. For example, the action may include communicating with one or more nodes 142 of the core network 140 to change a parameter of the one or more nodes 142 (e.g., update a node to prepare for increased data traffic). In other examples, the action performed by the predictive model decision module 218 may include generating a report that indicates one or more metrics about the prediction of future user device preferences (e.g., how many users are expected to switch user devices, the type, brand, and/or model that users are expected to switch to, when the users are expected to switch user devices, etc.). In some examples, the report may be communicated (e.g., sent) to one or more user device distributors, such as a manufacturer, retail store, etc.

In some aspects, the telecom data 150 received at the computing device 170 may further include an indication of a user location of the user (e.g., USER1) associated with a respective current user device. If so, the prediction of future user device preferences may be generated by the predictive model decision module 218 with respect to a geographic region that includes the user location. For example, a record 160 included in the telecom data 150 may indicate that user is located in Bellevue, Wash. (e.g., based on billing address associated with the user). Thus, the prediction of future user device preferences may be generated with respect to all users located in the Bellevue area, such that suppliers and/or user device distributers may adjust and/or update their supplies of user devices for specific geographic locations.

Figure 4:
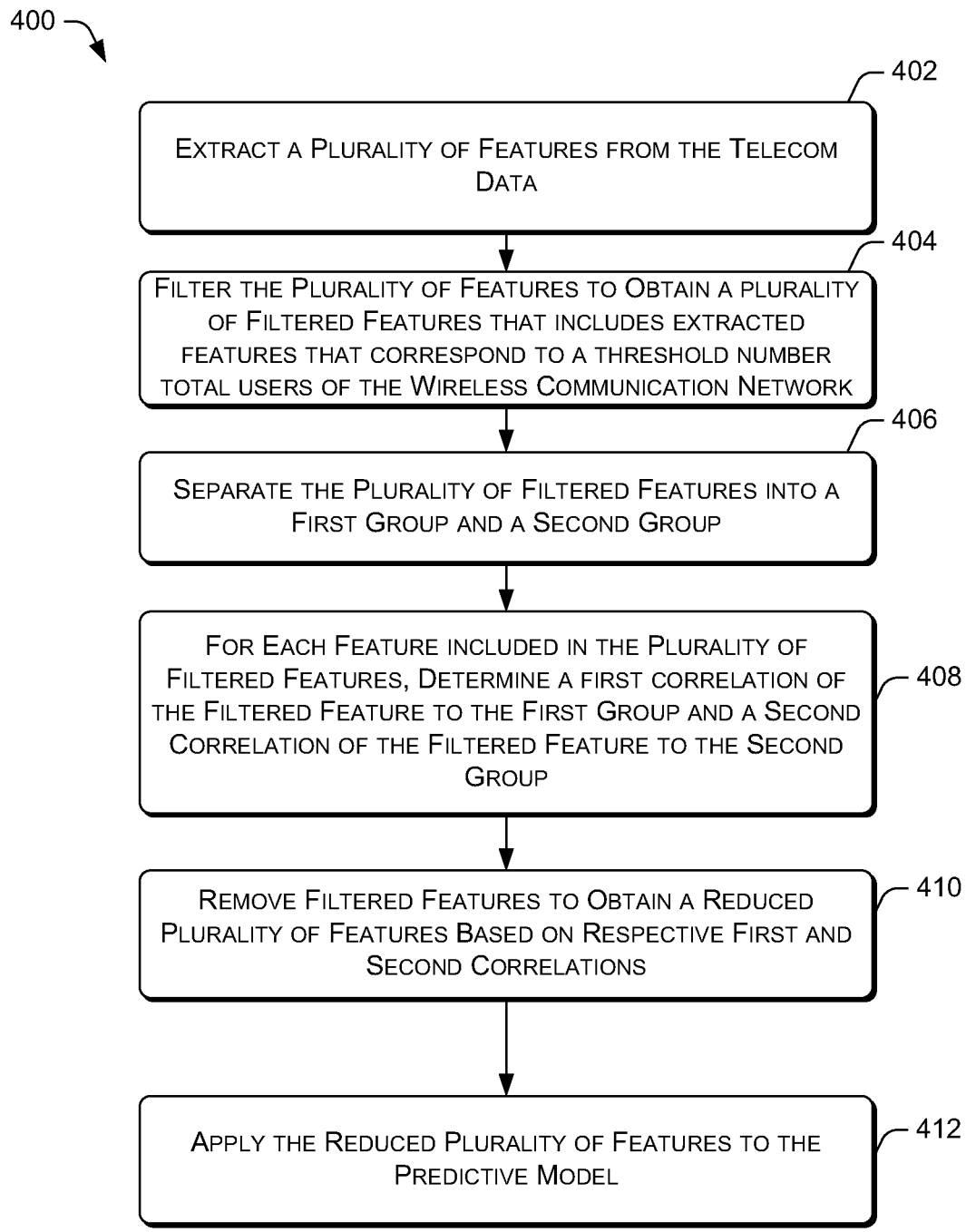
FIG. 4 is a flow diagram of an example process for updating a predictive model for use with future user device preference prediction.
Figure 5:
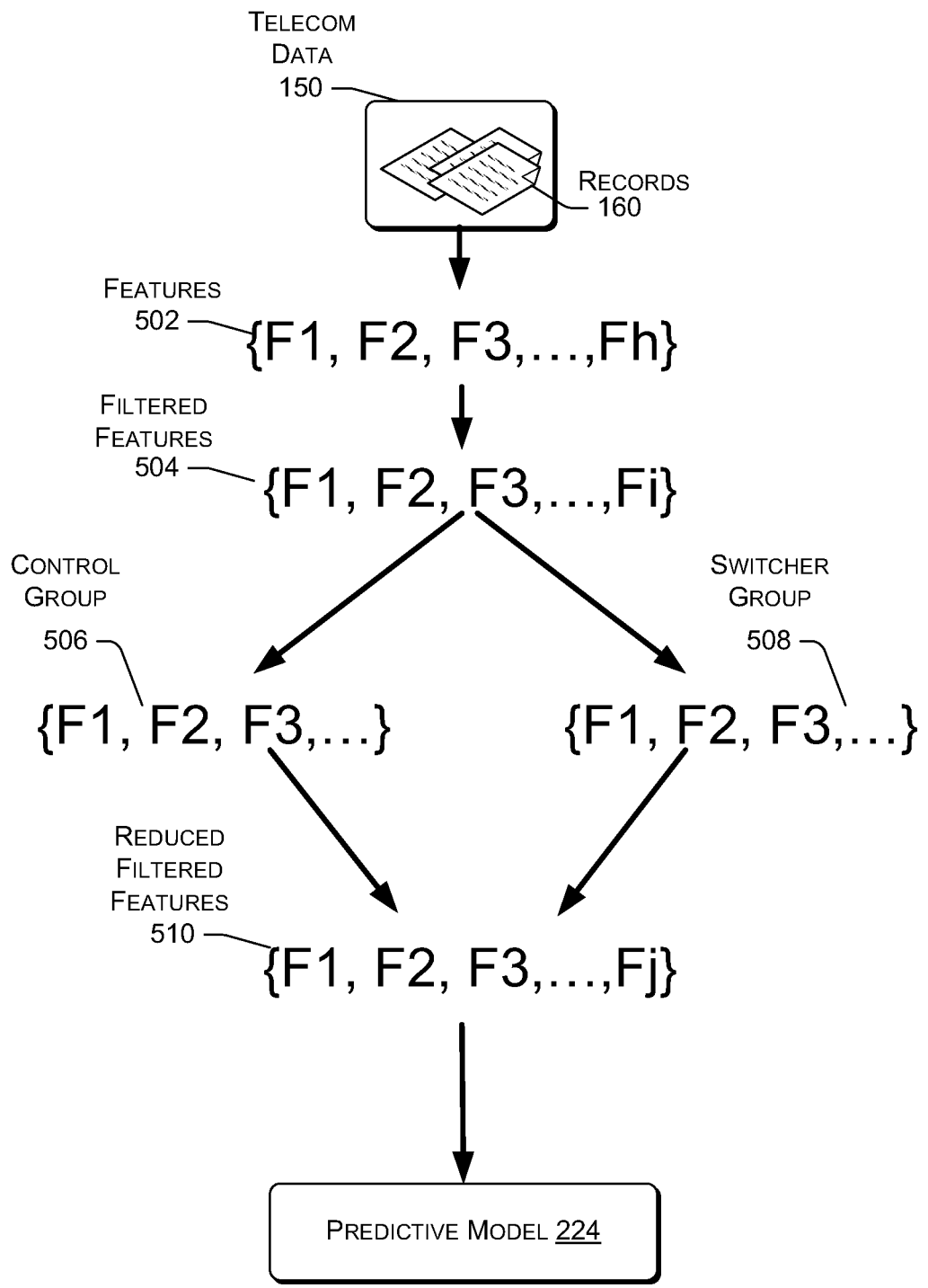
FIG. 5 is a diagram illustrating an example implementation of updating a predictive model for use with future user device preference prediction.

FIG. 4 is a flow diagram of an example process 400 for updating the predictive model 224 for use with future user device preference prediction. Process 400 is one possible process performed by the feature extractor module 216 and predictive model training module 214 of FIG. 2. Process 400 is described with reference to FIG. 5 which illustrates an example implementation of updating the predictive model 224.

In a process block 402, the feature extractor module 216 extracts a plurality of features 502. As discussed above, a feature is an identifiable set of one or more data points that are comparable. In some aspects, an extracted feature may be referred to as an "interesting" part of the telecom data 150 as represented by the records 160. A desirable property for feature detection is repeatability: whether or not the same feature may be detected in two or more different records 160.

In some examples, feature detection is a low-level processing operation. That is, it is usually performed as the first operation on the telecom data 150, and includes examining record 160 to see if there is a feature present. Occasionally, when feature detection is computationally expensive and there are time constraints, a higher-level algorithm may be used to guide the feature detection stage, so that only certain parts of the telecom data 150 are searched for features.

Next, in process block 404, the plurality of features 502 are filtered to obtain a plurality of filtered features 504. The Filtered features 504 may be generated such that only extracted features which represent a threshold number of total users of the wireless communication network 100 are retained. For example, an identified feature that only represents a minor number (e.g., <50%) of users would be discarded, whereas a feature that corresponds to a majority (e.g., >50%) of users would be kept. In some examples, the threshold number is higher, such as 90%. Thus, only features that correspond to 90% of the total number of users in the wireless communication network 100 may be retained in the plurality of filtered features 504. By way of example, an identified feature, such as a user visiting a particular website, may only be detected as being performed by a small number (e.g., 10%) of the total users. In this case, the identified feature may be discarded as it would not be a reliable predictor of future user device preferences if applied to other users of the wireless communication network 100.

In process block 406, the plurality of filtered features 504 are then separated into two groups: a first group (i.e., control group 506), and a second group (i.e., switcher group 508). The control group 506 may include filtered features corresponding to users who did not switch from a respective current user device to another user device over a time period that the telecom data 150 was collected (e.g., previous 3-months). The switcher group 508 may include filtered features corresponding to users who did indeed switch from a respective current user device to another user device over the time period. In some examples, the control group 506 may be larger than the switcher group 508 (i.e., more instances of features in the control group 506 as compared to the number of instances of features included in the switcher group 508). Accordingly, the predictive model training module 214 may undersample the control group 506 and/or oversample the switcher group 508. In some examples, undersampling and oversampling may involve one or more data analysis techniques to adjust the class distribution of the control group 506 and/or switcher group 508. The undersampling and/or oversampling may involve using a bias to select more or less instances of features from one of the groups than from the other. Example techniques for undersampling and oversampling the control group 506 and switcher group 508 may include the synthetic minority over-sampling technique (SMOTE) and the adaptive synthetic sampling approach (ADASYN).

In some examples, one or more of the same features may appear in both the control group 506 as appear in the switcher group 508. Accordingly, in process block 408, the predictive model training module 214 may determine a correlation between each particular feature and the two groups 506 and 508. That is, the features may be further filtered to keep only those features that clearly indicate that a user has/will switch devices. For example, a feature that has a close correlation to both the control group 506 and the switcher group 508 may be discarded (e.g., an identified feature has a 50% chance of indicating that a user will switch devices and a 50% chance of indicating that a user will not switch devices). Conversely, if a feature is closely correlated to one of the groups, then the feature may be retained (e.g., in 90% of the occurrences that this feature appears, the user ends up switching devices, or in 90% of the occurrences that this feature appears, the user ends up not switching devices).

Accordingly, process block 410 includes removing filtered features to obtain a plurality of reduced filtered features 510, where the plurality of reduced filtered features 510 includes only those features which have a strong correlation to one of the two groups 506 and 508. By way of example, for each feature included in the plurality of filtered features 504, the predictive model training module 214 may determine a first correlation of the filtered feature to the control group 506 and a second correlation of the filtered feature to the switcher group 508. If a difference between the first correlation and the second correlation is less than a minimum correlation threshold, then the filtered feature may be removed such that it does not appear in the plurality of reduced filtered features 510. If, however, the difference between the first correlation and the second correlation is greater than the minimum correlation threshold, then the filtered feature may be kept such that it is retained in the plurality of reduced filtered features 510.

By way of example, consider a first feature that has a 10% correlation to the control group 506 (i.e., 10% of occurrences of the first feature are in the control group 506) and a 90% correlation to the switcher group 508 (i.e., 90% of the occurrences of the first feature are in the switcher group 508). In this case, assuming a minimum correlation threshold of 75%, the first feature would be retained (e.g., 90%–10%=80%, which is greater than the 75% minimum correlation threshold). However, if the first feature's correlation to the first group is determined to be 40% and the first feature's correlation to the second group is 60%, then the first feature may be removed and not included in the plurality of reduced filtered features 510 (e.g., 60%–40%=20%, which is less than the 75% minimum correlation threshold).

Accordingly, the plurality of reduced filtered features 510 may include only those features which have a strong correlation (i.e., greater than the minimum correlation threshold) to either control group 506 or to switcher group 508.

Next, in process block 412, the predictive model training module 214 updates the predictive model 224 based on the plurality of reduced filtered features 510. In some examples, the updated predictive model 224 may be stored to data store 222 and for application to subsequently acquired telecom data 150.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method, comprising:
    collecting telecom data from at least one node of a wireless communication network, wherein the telecom data includes records for a plurality of occurrences of user interaction with the wireless communication network via a respective current user device;
    applying the telecom data to a predictive model to obtain a prediction of future user device preferences, wherein the prediction of future user device preferences com- prises an indication that a user will switch from the respective current user device to another user device for future use with the wireless communication network;

performing an action with respect to the wireless communication network of changing a parameter of the at least one node of the wireless communication network in response to the prediction of future user device preferences; and updating the predictive model, including:
  extracting a plurality of features from the telecom data, wherein a feature is an identifiable set of one or more data points that are comparable in the telecom data based on the plurality of occurrences of the user interaction with the wireless communication network;
  filtering the plurality of features to obtain one or more filtered features that correspond to a threshold number of total users of the wireless communication network; and
  applying the one or more filtered features to the predictive model for application to subsequently acquired telecom data for performing the action with respect to the wireless communication network.

2. The computer-implemented method of claim 1, wherein the prediction of future user device preferences further comprises at least one additional indication selected from the group consisting of: an indication of when the user will switch from the respective current user device to the another user device for the future use with the wireless communication network, an indication of a type, brand, or model of the another user device, and an indication of a number of users that will switch from their respective current user device to another user device for future use with the wireless communication network.

3. The computer-implemented method of claim 1, wherein the records included in the telecom data comprise at least one event data record (EDR) corresponding to a user's interaction with the wireless communication network via the respective current user device.

4. The computer-implemented method of claim 3, wherein the at least one EDR comprises click-stream data corresponding to a navigation of the Internet by the user.

5. The computer-implemented method of claim 4, wherein the click-stream data comprises domain data and protocol data, the domain data indicating at least one domain name of an internet service or website visited by the user, the protocol data indicating at least one additional information selected from the group consisting of: a protocol utilized by the respective current user device when accessing the internet service or website, a frequency with which the respective current user device accessed the internet service or website, an amount of data exchanged between the respective current user device and the internet service or website, and a duration of at least one occurrence of the user accessing the internet service or website via the respective current user device.

6. The computer-implemented method of claim 1, wherein the threshold number represents a majority of the total users of the wireless communication network.

7. The computer-implemented method of claim 1, further comprising:
  separating the plurality of filtered features into a first group and a second group, the first group including filtered features corresponding to users who did not switch from the respective current user device to another user device over a time period that the telecom data was collected, the second group including filtered features corresponding to users who did switch from the respective current user device to the another user device during the time period that the telecom data was collected.

8. The computer-implemented method of claim 7, further comprising:
  for each filtered feature included in the plurality of filtered features, determining a first correlation of the filtered feature to the first group and a second correlation of the filtered feature to the second group; and
  removing the filtered feature from the plurality of filtered features to obtain a reduced plurality of filtered features based on the first and second correlations.

9. The computer-implemented method of claim 8, wherein removing the filtered feature comprises:
  removing the filtered feature from the plurality of filtered features in response to determining that a difference between the first correlation and the second correlation is less than a minimum correlation threshold.

10. The computer-implemented method of claim 8, further comprising:
  keeping the filtered feature in the plurality of filtered features in response to determining that a difference between the first correlation and the second correlation is greater than a minimum correlation threshold.

11. The computer-implemented method of claim 1, wherein the telecom data further includes an indication of a user location of the user associated with the respective current user device, and wherein the prediction of future user device preferences is with respect to a geographic region that includes the user location.

12. One or more non-transitory computer-readable media storing computer-executable instructions, which when executed by the at least one processor, direct the at least one processor to:
  collect telecom data from at least one node of a wireless communication network, wherein the telecom data includes records for a plurality of occurrences of user interaction with the wireless communication network via a respective current user device;
  apply the telecom data to a predictive model to obtain a prediction of future user device preferences, wherein the prediction of the future user device preferences comprises an indication that a user will switch from the respective current user device to another user device for future use with the wireless communication network; and
  perform an action with respect to the wireless communication network of changing a parameter of the at least one node of the wireless communication network in response to the prediction of future user device preferences; and
  update the predictive model, including:
    extract a plurality of features from the telecom data, wherein a feature is an identifiable set of one or more data points that are comparable in the telecom data based on the plurality of occurrences of the user interaction with the wireless communication network;
    filter the plurality of features to obtain one or more filtered features that correspond to a threshold number of total users of the wireless communication network; and
    apply the one or more filtered features to the predictive model for application to subsequently acquired telecom data for performing the action with respect to the wireless communication network.

13. The one or more non-transitory computer-readable media of claim 12, wherein the records included in the telecom data comprise at least one event data record (EDR) corresponding to a user's interaction with the wireless communication network via the respective current user device, wherein the at least one EDR comprises click-stream data corresponding to a navigation of the Internet by the user.

14. The one or more non-transitory computer-readable media of claim 13, wherein the click-stream data comprises domain data and protocol data, the domain data indicating at least one domain name of an internet service or website visited by the user, the protocol data indicating at least one additional information selected from the group consisting of: a protocol utilized by the respective current user device when accessing the internet service or website, a frequency with which the respective current user device accessed the internet service or website, an amount of data exchanged between the respective current user device and the internet service or website, and a duration of at least one occurrence of the user accessing the internet service or website via the respective current user device.

15. A computing device, comprising:
at least one processor; and
at least one memory coupled to the at least one processor, the at least one memory having instructions stored therein, which when executed by the at least one processor, direct the computing device to:
collect telecom data from at least one node of a wireless communication network, wherein the telecom data includes records for a plurality of occurrences of user interaction with the wireless communication network via a respective current user device;
apply the telecom data to a predictive model to obtain a prediction of future user device preferences, wherein the prediction of future user device preferences comprises an indication that a user will switch from the respective current user device to another user device for future use with the wireless communication network; and
perform an action with respect to the wireless communication network of changing a parameter of the at least one node of the wireless communication network in response to the prediction of future user device preferences; and
update the predictive model, including:
extract a plurality of features from the telecom data, wherein a feature is an identifiable set of one or more data points that are comparable in the telecom data based on the plurality of occurrences of the user interaction with the wireless communication network;
filter the plurality of features to obtain one or more filtered features that correspond to a threshold number of total users of the wireless communication network; and
apply the one or more filtered features to the predictive model for application to subsequently acquired telecom data for performing the action with respect to the wireless communication network.

16. The computing device of claim 15, wherein the records included in the telecom data comprise at least one event data record (EDR) corresponding to a user's interaction with the wireless communication network via the respective current user device, wherein the at least one EDR comprises click-stream data corresponding to a navigation of the Internet by the user.

* * * * *